July 5, 1938.    F. M. GUY    2,122,839
RESILIENT BUSHING AND METHOD OF MAKING THE SAME
Filed Oct. 15, 1936
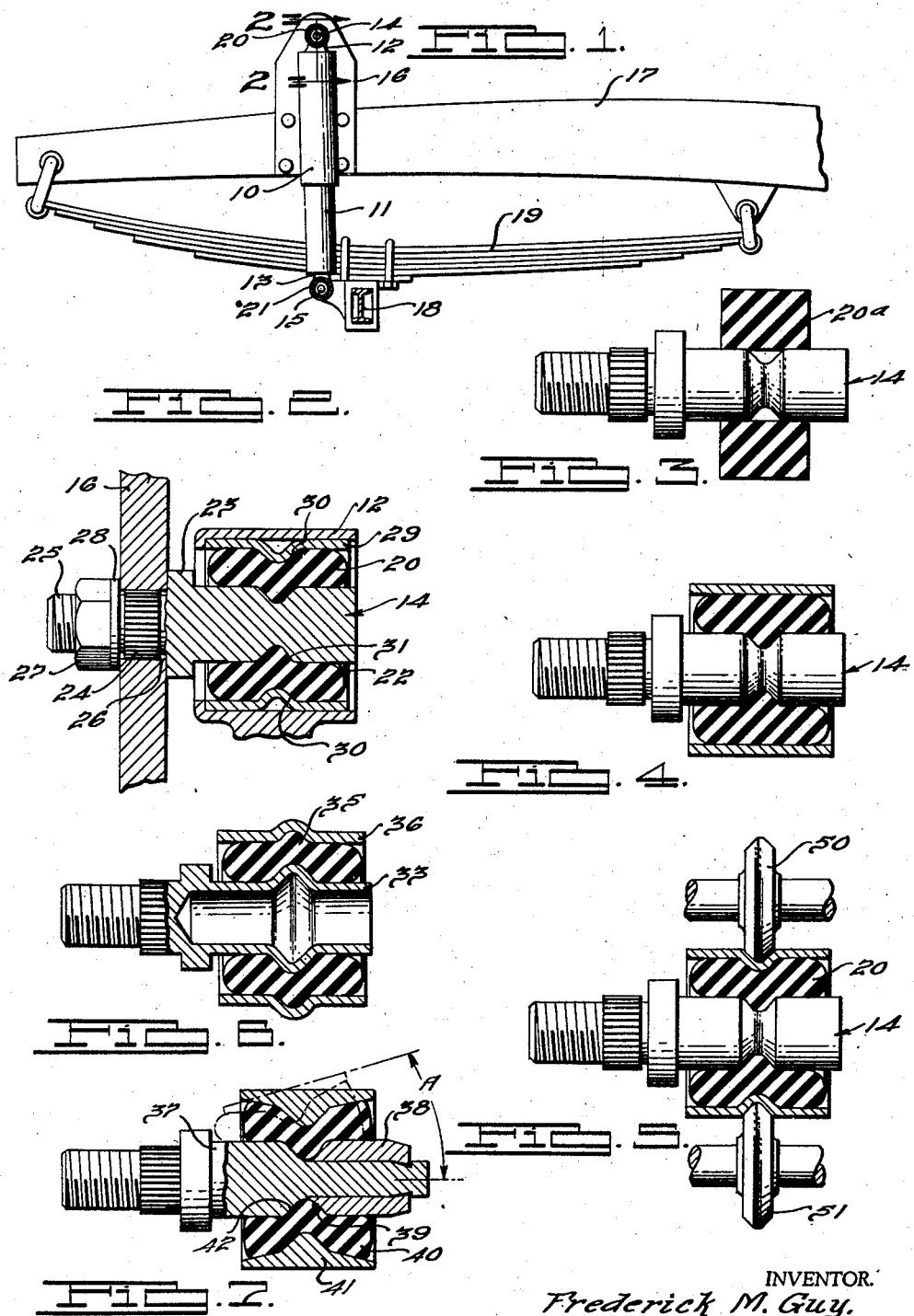
INVENTOR.
Frederick M. Guy.
BY Dike, Calver and Gray
ATTORNEYS.

Patented July 5, 1938

2,122,839

UNITED STATES PATENT OFFICE 2,122,839

RESILIENT BUSHING AND METHOD OF MAKING THE SAME

Frederick M. Guy, Detroit, Mich., assignor to Guy and Murton, Incorporated, Detroit, Mich., a corporation of Michigan Application October 15, 1936, Serial No. 105,664

3 Claims. (Cl. 29—149.5)

The present invention relates to resilient bushings and the method of making the same.

Prior to the present invention resilient bushings have been suggested in which an inner core is connected with an outer shell through the medium of an intermediate layer of a resilient material, such as rubber. In one known method of forming such bushings the resilient member is compressed between the core and the shell either by expansion of the core or by contraction of the shell, or both, with such force that a molecular deformation of the resilient material results and the core and shell are held in their relative positions by the frictional engagement of the resilient member with the surfaces of the core and shell. In such constructions, the connected parts are secured against disengagement by endwise movement only by frictional engagement betwen the resilient member and the core and the shell. This in turn depends upon the compression forces imposed upon the resilient mass. These forces in turn affect the resiliency of the mass so that if the core and shell are secured against endwise displacement, the forces effecting this securing of the parts at the same time impair or limit the amount of axial movement between the parts.

In other known types of resilient bushings the resilient material is secured as by bonding or the like between the core and the shell, the rubber being in a state of initial tension or in a state in which neither tension nor compression forces are present in the rubber. In all such known bushings the bushing provides a greater resistance to rotative movements between the core and the shell than it does to endwise movements between the core and the shell so that while such bushings may be used for connecting members where it is desired to resist yieldingly the relative rotative movement between the members, such members do not have a sufficient resistance to endwise movements to permit satisfactory use in certain installations, such for example as spring shackle connections, particularly those used with transverse springs, shock absorber connections, and the like or similar uses.

One of the objects of the present invention, therefore, is to provide a resilient bushing which is adapted to permit relative movement of the connected members radially and axially through a body of compressed resilient material, while locking the connected members against displacement due to endwise movements thereof.

Another object of the invention is to provide a resilient bushing of the type in which a core and a shell are resiliently connected through a compressed and deformed mass of resilient material locked between the core and the shell in a manner permitting axial movements of the core and shell and in which provision is made for controlling the locking of the parts and the resilient mass to provide a sufficient volume of resilient material to resist yieldingly the forces tending to displace said core and shell.

Another object of the invention is to provide a resilient bushing which is adapted to permit yielding movement between the core and the shell by working of the resilient element without substantial friction losses due to slippage between the resilient element and the core or shell.

Another object of the invention is to provide a novel resilient connector in which considerable relative movements of the connected members are permitted but only a relatively small amount of resilient material is used in the connector.

A further object of the invention is to provide a resilient connector wherein resilient resistance to endwise movement of the connected parts is provided.

A still further object of the invention is to provide a resilient connector made in the form of a bushing compressed on a shaft or a stud by a swaged shell, wherein excessive axial movement between the shaft and the shell is limited and possible endwise separation of the connected members is prevented.

An added object of the invention is to provide a novel resilient connector of the foregoing character which is durable in use, simple in construction and economical to manufacture.

Other objects and advantages of this invention will appear in the following description and appended claims, reference being had to the accompanying drawing forming a part of this specification, wherein three embodiments of the present invention are illustrated.

In the drawing, wherein like reference characters designate corresponding parts in the several views, Fig. 1 is a side elevation showing a resilient bushing of the present invention as utilized in a shock absorber connection with a part of a chassis of a motor vehicle;

Fig. 2 is a longitudinal sectional view of a resilient bushing of the present invention, the section being taken substantially on the line 2—2 of Fig. 1;

Fig. 3 illustrates a step in assembling my novel connector;

Fig. 4 illustrates the step succeeding the step shown in Fig. 3 in assembling the connector;

Fig. 5 illustrates a final step in assembling the connector in accordance with the invention;

Fig. 6 is a longitudinal sectional view of a modified structure embodying the present invention; and Fig. 7 is a longitudinal sectional view of another modification of the invention.

Before explaining in detail the present invention it is to be understood that the invention is not lmited in its application to the details of construction and arrangement of parts illustrated in the accompanying drawing, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

In the drawing there is illustrated, by way of example, a novel resilient connector constructed in accordance with one embodiment of the invention, said connector being here shown and described as a part of a conventional shock absorber connection operatively mounted on the chassis of a motor vehicle. It is to be understood, however, that I do not desire to be limited to the above specific employment of my novel connector, since with proper changes in design the same may be advantageously used in many other structures, such for example as in steering rod knuckle joints, spring shackles, and the like.

Referring to Fig. 1 the structure illustrated therein comprises a shock absorber of the telescopic type, having an upper snubber 10 and a lower snubber 11, telescopically arranged with respect to each other. On the ends of each of said snubbers there are provided eyelets 12 and 13 adapted to receive the studs 14 and 15 carried by a bracket 16 secured to the vehicle frame 17 and to the axle 18 supported by a leaf spring 19 shackled at its ends to said frame 17. Between the eyelets 12 and 13 and their respective studs 14 and 15 there are provided rubber bushings 20 and 21 respectively, mounted therein in a manner hereinafter described in detail. The construction of the resilient connectors at the upper telescopic member 10 and the lower telescopic member 11 is similar, and only one of said connectors is herein described in detail.

Referring to Fig. 2, the structure illustrated therein comprises the stud 14 having a cylindrical portion 22, a shoulder 23, a knurled portion 24, and a threaded shank 25. Said stud 14 is pressed into a hole 26 provided in the bracket 16, engaging the same by its knurled portion 24, whereby rotation of the stud with respect to said bracket 16 is prevented. A nut 27 and a lock washer 28 are provided at the threaded shank 25 which, when tightened up, secure the stud 14 to the bracket 16 by drawing the shoulder 23 against said bracket 16. The eyelet 12 of the upper telescopic member 10 is bored to receive a cylindrical shell 29 surrounding the rubber bushing 20. Said shell 29 is provided with a circular V-shaped rolled bead 30 projecting toward the axis of the stud 14. The stud 14 is, in turn, provided with a groove 31 concentric with respect to said bead 30 and lying substantially in the same plane therewith.

The shell 29 is swaged or reduced on the rubber bushing 20, whereby the rubber of the bushing is put in compression in a radial direction, which it is believed results in shortening of the radial fibers and an axial stretching of the bushing, so that the rubber completely fills the groove 31.

By virtue of the above construction I am able to retain all the benefits of the radially compressed bushings and eliminate the disadvantages which have heretofore been considered as inherent in such bushings. If no means for locking the rubber is provided and the rubber bushing is swaged on a smooth cylindrical surface by a smooth shell as is the case in prior structures, the connection thus effected does not afford sufficient resistance to end thrust between the connected parts. This is due to a variety of factors, and particularly to the fact that the rubber fibers have different stresses in different directions, and the further fact that the rounded bulging ends of the rubber in the bushing causes the bushing to roll on the shaft longitudinally, this rolling being restricted only by decreased resilient resistance of the bushing. In some specific instances, particularly with short thick bushings, the bushing assumes the shape of a ring of substantially oval cross section and the stud can roll out on such rubber bushing when subjected to high end thrust loads. Making the bushing thin and long operates to destroy the amount of resiliency ordinarily required. By providing the locking means exemplified in the present embodiment by the bead and groove, I increase the longitudinal resistance of the bushing by inducing compression and shearing stresses in the rubber mass of the bushing when the connector is subjected to an end thrust.

Figs. 3, 4 and 5 illustrate the method of assembling the connector shown in Fig. 2. An initial step in the method employed comprises arranging a comparatively narrow and thick rubber ring 20a on the stud 14. The outer shell is next placed around the rubber ring 20a and is swaged or reduced thereon in any suitable manner, such as with the aid of a rotary swaging machine. In the course of this operation the rubber ring 20a assumes the position illustrated in Fig. 4. The last operations consist in forming the rolled bead 30 on the shell 20, preferably with the aid of a rolling machine indicated diagrammatically by the rollers 50 and 51 (Fig. 5). One of the advantages of the structure shown in Fig. 2 and of the method described above results from the fact that the above operations can be performed and the connector assembled before mounting of the shock absorber or other part on the chassis. If desired, the completed connector assembly can be pressed into an eye of the shock absorber and peened thereon or otherwise secured thereto before connecting the shock absorber on the chassis.

Fig. 6 illustrates a modified form of a connector utilizing a bushing of the present invention, wherein the stud 33 is formed with a hollow body portion having a raised bead 34 provided thereon. In this instance a groove 35 is provided on the outer shell 36. In assembling this structure, a thick narrow rubber ring similar to the ring 20a is placed on the stud 33 and the outer shell 36 having a preformed groove 35 is swaged thereon. An expansion member is next placed on the inside of the stud 33 and the stud is expanded so as to form the bead 34. This forces the rubber bushing into the space between the bead 34 and the groove 35 and forms a resilient lock between the shell 36 and the stud 33. If desired, the shell 36 may be dispensed with, and the groove 35 may be formed on a formed bored surface of the part to which the bushing is to be attached. With this arrangement the stud 33 is expanded outwardly in addition to forming the bead 34, thus compressing the rubber between the stud and the part to which the bushing is to be attached. Thus, in this type of construction the connector and the shock absorber may be locked together as an assembly before they are attached to the vehicle.

In the modified structure shown in Fig. 7, the stud is composed of two sections, namely, a tapered core 37 and a sleeve 38 adapted to fit on the smaller end of said core 37 and to be locked thereon in any suitable manner, such as by peening. Assembled together as described, the core 37 and the sleeve 38 form a stud with a groove 39 provided on its cylindrical portion. The rubber bushing 40 is arranged on the smaller end of the core 37 before putting the sleeve 38 in place, and the outer shell 41 having a bead 42 is forced over the rubber by axial movement thereon. The resulting positions of the shell and the bushing are indicated in Fig. 7 in dotted lines. The angle of taper of the shell 41 indicated by the letter A, may vary, 15° being a preferred angle for the structure illustrated. The sleeve 38 is next put in place and locked on the core 37, as mentioned. Finally, the shell 39 is swaged or reduced to the shape shown in Fig. 7 in solid lines. Thus a completed assembly is produced which can be pressed into the respective eyelet of the shock absorber, or other device in which the bushing is to be utilized. This structure as far as locking of the core and shell with the resilient member is concerned, possesses advantages similar to those described for the preferred structure.

While vulcanized rubber is at the present time the preferred material from which to form the resilient element of this bushing, it is to be understood that various types of such material may be used, as well as substitutes therefor, and I do not desire to be limited to the use of any particular type of resilient materials.

Thus considered from one of its broader aspects, my invention contemplates providing a novel resilient connector including a radially compressed resilient bushing, said bushing being provided with locking means adapted to provide a cushioned locking connection to prevent endwise displacement of the connected parts and an increased resiliency of the bushing to axial thrust loads. The bushing of the present invention likewise permits yielding resilient movements between the parts when subjected to forces tending to cause endwise movement thereof.

A resilient bushing of the present invention may be utilized in a number of mechanical devices which, by way of example but not of limitation, may include in addition to the foregoing uses, the following: Universal joints employing resilient connections between a carrier member and a driving and driven shaft, flexible couplings in which the drive is transmitted from the driving shaft to the driven shaft through an interposed resilient bushing, linkage connections of various kinds as used in link belts, pivoting arms, and the like, clutches employing resilient clutch centers, resilient connections between linkage members employed on braking systems in motor vehicles, and the like or similar uses.

It is understood that in forming the bushing of the present invention, the resilient element must be forced into place between the core and the shell under pressures exceeding the elastic limit of the resilient mass so that mass will take a permanent form or shape in the structure.

In all of the foregoing named examples, as well as in others that will occur to those skilled in the art, the resilient bushing provides for a yielding connection between two connected parts, one part being connected to the shell and the other part being connected to the core, and the yielding movement being permitted by flexure or working occurring within the resilient mass providing the yielding connection between the core and the shell. The foregoing, as well as other uses to which the bushing may be adapted, are to be considered as included within the scope of the appended claims.

I claim:

1. In a method of making a resilient connector having a stud composed of a core and a sleeve fitted thereon, said core and said sleeve adapted, when fitted together, to form a stud containing a groove therein, an outer shell, and a resilient member arranged between such stud and said shell; the steps of arranging the resilient member on the core, placing the tapered outer shell thereon, fitting said sleeve at the thinner end of said core and locking it thereon by swaging the outer end of the sleeve into a locking recess near the outer extremity of the thinner portion of said core, and thereafter swaging the outer shell on said resilient member into a shape substantially parallel to the longitudinal axis of said stud and thereby locking the resilient member between said stud and said shell.

2. A resilient coupling comprising a two-piece stud, said stud consisting of a core having shank and shoulder portions near one end thereof and sharply tapering into an extending portion of decreased but substantially uniform diameter on the opposite end therefrom, and a sleeve fitted substantially completely over the said extending portion and compressed into a groove provided on the end of said portion, said sleeve being of substantially the same diameter as the said core and having an end portion sharply tapering in an opposite direction from the taper of the core, whereby the stud is created, said stud being of substantially uniform diameter but containing an annular concentric groove between the said tapering portions of the core and sleeve parts thereof; a concentric shell arranged around said stud, a raised bead on the inside surface of said shell, arranged to correspond with the groove formed on said stud and a rubber bushing radially compressed between said stud and said shell and locked in position between said bead and groove.

3. A resilient coupling comprising a two-piece stud, said stud consisting of a core having shank and shoulder portions near one end thereof and sharply tapering into an extending portion of decreased but substantially uniform diameter on the opposite end therefrom, said extending portion having a tapering recess near the end thereof, and a sleeve fitted substantially completely over the said extending portion and locked into the said recess, said sleeve being of substsantially the same diameter as the core and having an end portion sharply tapering in an opposite direction from the taper of the core, whereby the stud is created, said stud being of substantially uniform diameter but containing an annular concentric groove between the said tapering portions of the core and sleeve parts thereof; a concentric shell arranged around said stud, a raised bead on the inside surface of said shell, arranged to correspond with the groove formed on said stud and a rubber bushing radially compressed between said stud and said shell and locked in position between said bead and groove.

FREDERICK M. GUY.